(12) United States Patent
Miller et al.

(10) Patent No.: US 9,626,542 B2
(45) Date of Patent: *Apr. 18, 2017

(54) HOST FEEDBACK OF SCAN STATUS

(71) Applicant: Socket Mobile, Inc., Newark, CA (US)

(72) Inventors: Robert John Miller, Fremont, CA (US); Allan Leafblad, Livermore, CA (US); Thomas J. Newman, Discovery Bay, CA (US); Leonard Ott, Livermore, CA (US); John E. Brandon, San Rafael, CA (US); Charles E. Ader, Livermore, CA (US); Timothy Miller, Scotts Valley, CA (US)

(73) Assignee: Socket Mobile, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,482

(22) Filed: Jul. 13, 2015

(65) Prior Publication Data

US 2016/0171268 A1 Jun. 16, 2016

Related U.S. Application Data

(63) Continuation of application No. 14/450,802, filed on Aug. 4, 2014, now Pat. No. 9,082,030, which is a (Continued)

(51) Int. Cl.
*G06K 7/10* (2006.01)
*G06K 7/00* (2006.01)
(Continued)

(52) U.S. Cl.
CPC ....... *G06K 7/10891* (2013.01); *G06K 7/0004* (2013.01); *G06K 7/01* (2013.01);
(Continued)

(58) Field of Classification Search
CPC .... G06K 7/0004; G06K 7/01; G06K 7/10009; G06K 7/10881; G06K 7/10891
(Continued)

(56) References Cited

U.S. PATENT DOCUMENTS 7,429,000 B1* 9/2008 Ott ..................... G06K 7/10881
235/383
7,942,326 B2* 5/2011 Miller .................. G06K 7/0004
235/440

* cited by examiner

*Primary Examiner* — Seung Lee
(74) *Attorney, Agent, or Firm* — PatentVentures; Bennett Smith; Korbin Van Dyke

(57) ABSTRACT

A multi-mode ring scanner (MMRS) has a ring unit for wearing on a finger. The MMRS optionally has a wrist unit coupled to the ring unit, such as via a cable. The MMRS optionally communicates wirelessly with a computing device. The ring unit has one or more scanners (such as an optical scanner or an RFID tag reader). The ring unit optionally has two paddle switches for activation by inward pressure from fingers adjacent to the finger. The two switches enable specifying operation of the MMRS in a plurality of modes and/or to communicate a plurality of information codes to the computing device. The computing device is optionally enabled to assign a function to each combination of activation of the two switches. A scanning system including the MMRS optionally provides feedback to a user based on feedback from a host processor.

20 Claims, 10 Drawing Sheets

Related U.S. Application Data continuation of application No. 13/684,716, filed on Nov. 26, 2012, now Pat. No. 8,794,527, which is a continuation of application No. 13/108,684, filed on May 16, 2011, now Pat. No. 8,317,102, which is a continuation of application No. 11/949,651, filed on Dec. 3, 2007, now Pat. No. 7,942,326, which is a continuation-in-part of application No. 11/082,190, filed on Mar. 16, 2005, now Pat. No. 7,429,000.

(60) Provisional application No. 60/868,338, filed on Dec. 3, 2006, provisional application No. 60/554,080, filed on Mar. 17, 2004.

(51) Int. Cl.
*G06K 7/01* (2006.01)
*G06Q 10/08* (2012.01)

(52) U.S. Cl.
CPC ..... *G06K 7/10009* (2013.01); *G06K 7/10386* (2013.01); *G06K 7/10396* (2013.01); *G06K 7/10881* (2013.01); *G06Q 10/087* (2013.01)

(58) Field of Classification Search
USPC .......... 235/383, 385, 462.01, 472.01–472.03
See application file for complete search history.

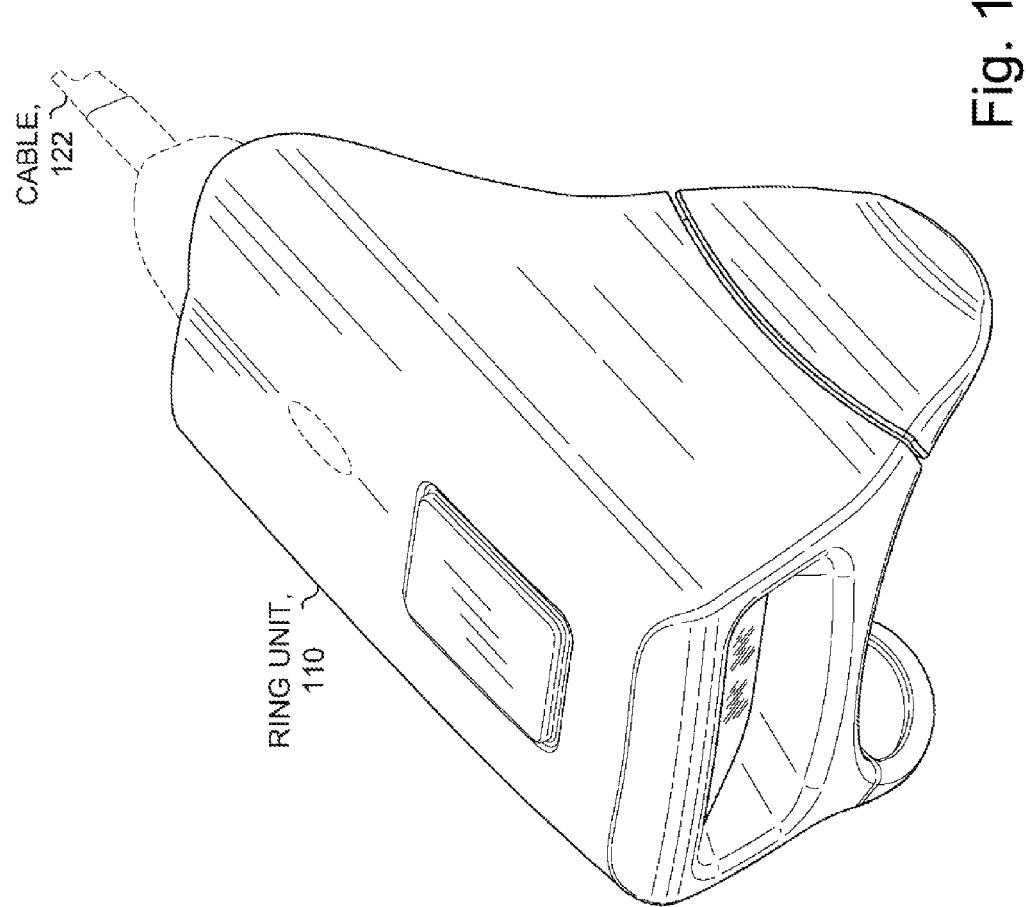

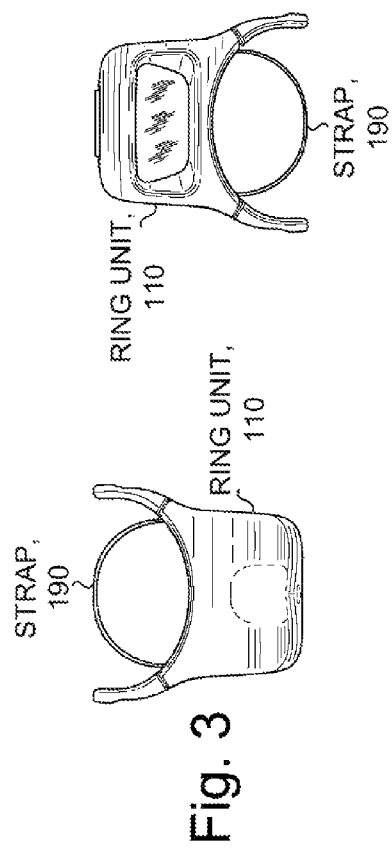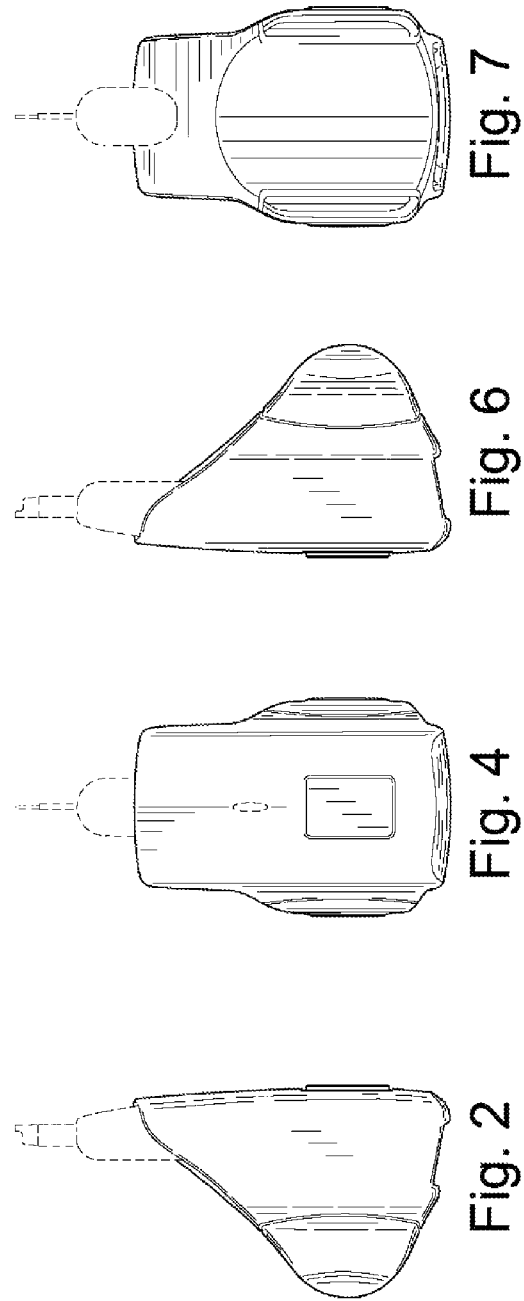

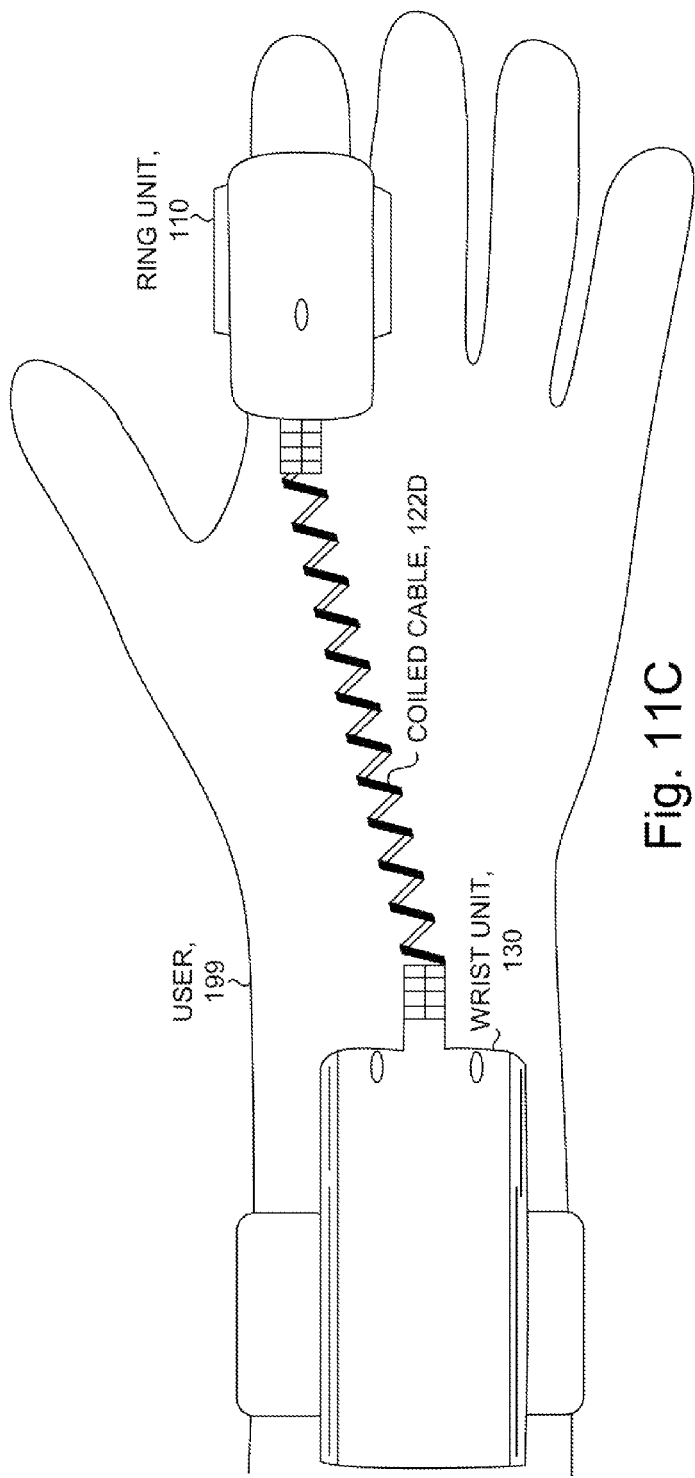

HOST FEEDBACK OF SCAN STATUS

CROSS REFERENCE TO RELATED APPLICATIONS

Priority benefit claims for this application are made in the accompanying Application Data Sheet. This application incorporates by reference for all purposes the following application(s), which are all owned by the owner of the instant application:

U.S. Non-Provisional application Ser. No. 14/450,802 , filed Aug. 4, 2014, now U.S. Pat. No. 9,082,030, first named inventor Robert John Miller, and entitled MULTI-MODE RING SCANNER;

U.S. Non-Provisional application Ser. No. 13/684,716 , filed Nov. 26, 2012, now U.S. Pat. No. 8,794,527, first named inventor Robert John Miller, and entitled HOST FEEDBACK OF SCAN STATUS FOR SCANNERS WIELDED BY HAND;

U.S. Non-Provisional application Ser. No. 13/108,684 , filed May 16, 2011, now U.S. Pat. No. 8,317,102, first named inventor Robert John Miller, and entitled MULTI-MODE RING SCANNER;

U.S. Non-Provisional application Ser. No. 11/949,651 , filed Dec. 3, 2007, now U.S. Pat. No. 7,942,326, first named inventor Robert John Miller, and entitled MULTI-MODE RING SCANNER;

U.S. Provisional Application Ser. No. 60/554,080 , filed Mar. 17, 2004, first named inventor Leonard Ott, and entitled CORDLESS HAND SCANNER WITH IMPROVED USER FEEDBACK;

U.S. Non-Provisional application Ser. No. 11/082,190 , filed Mar. 16, 2005, now U.S. Pat. No. 7,429,000, first named inventor Leonard Ott, and entitled CORDLESS HAND SCANNER WITH IMPROVED USER FEEDBACK; and U.S. Provisional Application Ser. No. 60/868,338 , filed Dec. 3, 2006, first named inventor Robert J. Miller, and entitled MULTI-MODE RING SCANNER.

BACKGROUND

Field

Advancements in scanning devices are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

SUMMARY

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments that tersely summarize illustrative systems and methods in accordance with the concepts taught herein. As is discussed in more detail in the Conclusions, the invention encompasses all possible modifications and variations within the scope of the issued claims.

BRIEF DESCRIPTION OF DRAWINGS

FIG. 1 illustrates selected details of an embodiment of a ring unit of a multi-mode ring scanner, showing a three-dimensional view of the top, the front, and the left side.

FIGS. 2 to 7 illustrate selected details of an embodiment of a ring unit of a multi-mode ring scanner, showing differing views.

FIGS. 11A and 11C illustrate selected details of other examples of deployments of a multi-mode ring scanner, showing from a top view selected details of embodiments of a stretch cable used to couple a ring unit and a wrist unit. FIGS. 11B and 11D illustrate, respectively, selected details of the stretch cables of FIGS. 11A and 11C from a side view.

DETAILED DESCRIPTION

Figure 8A:
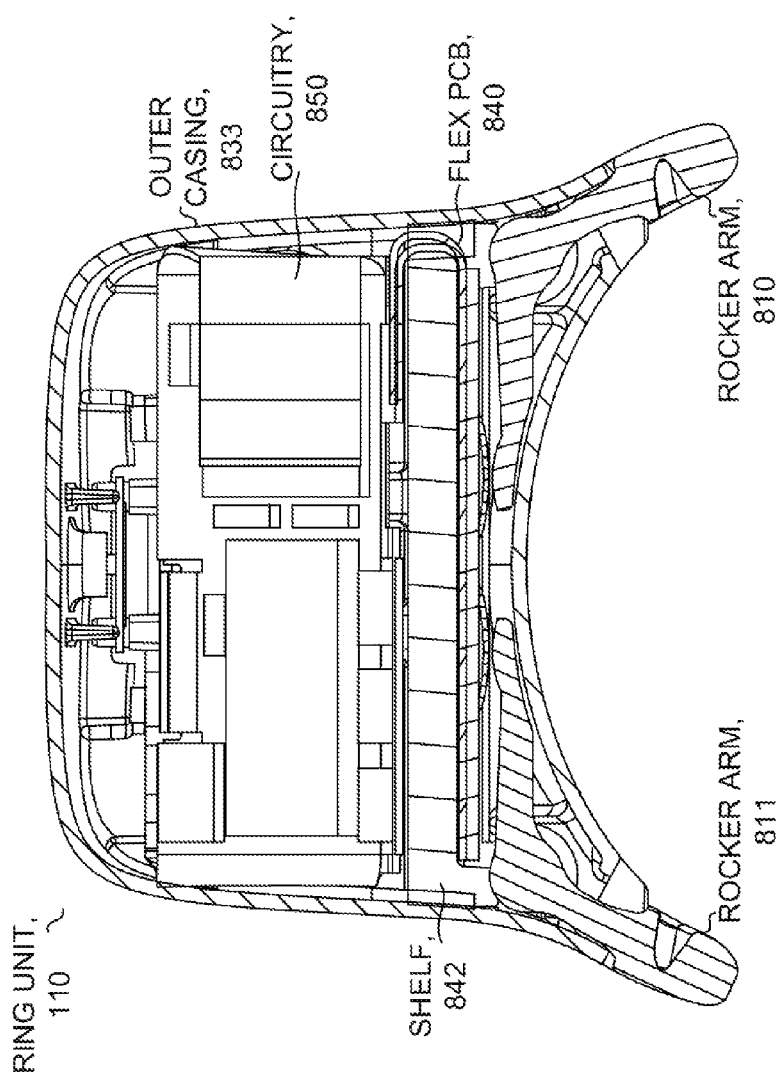
FIG. 8A illustrates selected details of an embodiment of a ring unit of a multi-mode ring scanner, showing a cross-sectional view of a vertical slice as seen from the front.

A detailed description of one or more embodiments of the invention is provided below along with accompanying figures that illustrate the principles of the invention. The invention is described in connection with the embodiments. It is well established that it is neither necessary, practical, or possible to exhaustively describe every embodiment of the invention. Thus the embodiments herein are understood to be merely illustrative, the invention is expressly not limited to or by any or all of the embodiments herein, and the invention encompasses numerous alternatives, modifications and equivalents. The existence of an embodiment in some way distinct from other embodiments may be described by such adjectives as "notable", "particular", "some", or equivalents thereof. All such similar characterizations should be considered to be interchangeable, being variously used to avoid monotony in the exposition and should not be construed as limiting the invention in any way or that the embodiments so labeled should be treated any differently than the other embodiments, as every embodiment described herein can be so characterized. Wherever multiple embodiments serve to illustrate variations in process, method, and/or program instruction features, other implementations are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided as examples and the invention may be practiced according to the claims without some or all of the details. For clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Multiple types of scanners/readers are in use today, including optical scanners and RFID tag readers. Optical scanning devices have been implemented in a variety of form factors, including some wearable forms. Current optical scanners are generally single function and/or lack flexible ways of providing dynamic user input. Further, cordless (wireless) hand-held scanners promise users greatly improved convenience, flexibility, and efficiency over previous corded scanners. The scan engines within such hand-held scanners function quite reliably. The wireless links, in and of themselves, also are reliable and generally have robust error correction. Nevertheless, the overall path between the scan engine and the host processor (which receives the scan data) relies upon a number of more or less independent components and may use a variety of links, with varying degrees of reliability and error detection. Furthermore, the host processor may be busy or otherwise not available. Thus, a successful scan by the scan engine does not in itself assure a successful scan received by the host processor. If the user has grown accustomed to a corded scanner, user confidence (and thereby user acceptance) in using a cordless scanner may also be lacking simply due to infamiliarity. Increased user confidence and acceptance for cordless hand-held scanners and increased system performance and reliability may be obtained through improved user feedback in accordance with the teachings herein. In an illustrative embodiment, the state of one or more indicators on the cordless scanner is changed as a result of feedback from a coupled host processor. This is in contrast to previous scanners where scan confirmation indicators were based simply on whether the scan engine alone performed a successful scan. Obtaining timely confirmation that the host processor has received the scan successfully (or not) leads to increased confidence in, and acceptance of, the cordless hand-held scanner and more adept use thereof.

A multi-mode ring scanner (MMRS) has a ring unit for wearing on a finger. The MMRS optionally has a wrist unit coupled to the ring unit, such as via a cable. The MMRS optionally communicates wirelessly with a computing device. The ring unit has one or more scanners (such as an optical scanner or an RFID tag reader). The ring unit optionally has two paddle switches for activation by inward pressure from fingers adjacent to the finger. The two switches enable specifying operation of the MMRS in a plurality of modes and optionally enable the MMRS to communicate a plurality of information codes to the computing device. The computing device is optionally enabled to assign a function to each combination of activation of the two switches. A scanning system including the MMRS optionally provides feedback to a user based on feedback from a host processor.

Acronyms

Elsewhere herein various shorthand abbreviations, or acronyms, are used. The descriptions of at least some of the acronyms follow.

| Acronym | Description |
| --- | --- |
| ASCII | American Standard Code for Information Interchange |
| CCD | Charge Coupled Device |
| CTS | Clear To Send |
| ESE | Extended SSI Engine |
| LAN | Local Area Network |
| LED | Light Emitting Diode |
| MMRS | Multi-Mode Ring Scanner |
| PAN | Personal Area Network |
| PC | Personal Computer |
| PCB | Printed Circuit Board |
| PCI | Peripheral Component Interconnect |
| PDA | Personal Digital Assistant |
| RF | Radio Frequency |
| RFID | Radio Frequency IDentification |
| RTS | Request To Send |
| S2H | Scanner-to-Host |
| SD | Secure Digital |
| SSI | Simple Serial Interface |
| UFL | User Feedback Logic |
| USB | Universal Serial Bus |
| UWB | Ultra Wide Band |
| WAN | Wide Area Network |
| WLAN | Wireless Local Area Network |
| WM | Wireless Module |
| WPAN | Wireless Personal Area Network |

EXAMPLE EMBODIMENTS

This introduction concludes with a collection of paragraphs that tersely summarize illustrative systems and methods in accordance with the concepts taught herein. Each of the paragraphs highlights various combinations of features. These compressed descriptions are not meant to be mutually exclusive, exhaustive, or restrictive, and the invention is not limited to these highlighted combinations. As is discussed in more detail in the Conclusion section, the invention encompasses all possible modifications and variations within the scope of the issued claims.

In some embodiments, an MMRS has a wrist unit and a ring unit coupled by a cable. In various embodiments, the cable is a flat cable, a ribbon cable, a coaxial cable, or a coiled cable or a bundle of wires, optionally enclosed in a sheath. In various embodiments, the cable is permanently fixed to the wrist unit and is detachable from the ring unit, or alternatively the cable is permanently fixed to the ring unit and is detachable from the wrist unit. In some embodiments, the cable is adapted to reduce slack between the wrist unit and the ring unit, such as via implementing the cable as a stretchable cable, a z-fold cable, a serpentine cable, or a coiled cable. In some embodiments, the cable is detachable from either or both of the wrist unit and the ring unit. In some embodiments, the ring unit is worn on a finger of a user. In some embodiments, the wrist unit is worn on a wrist (or forearm) of a user. In some embodiments, the wrist unit is adapted to be worn on a belt, or attached to a waist or another part of a body of a user.

In some embodiments, an MMRS has a wrist unit and a ring unit connected by a detachable cable. In other embodiments, an MMRS has a wrist unit and a ring unit coupled via wireless transceivers, such as Bluetooth transceivers. In some embodiments, the wrist unit has a communications mechanism for communicating with a network and/or a computing device. In various embodiments, the communications mechanism is one or more of a Bluetooth transceiver, an 802.11 wireless transceiver, a ZigBee transceiver, a UWB transceiver, a WLAN or WPAN transceiver, or an infrared transceiver.

In some embodiments, an MMRS has a ring unit, the ring unit having a communications mechanism for communicating with a network and/or a computing device. In various embodiments, the communications mechanism is one or more of a Bluetooth transceiver, an 802.11 wireless transceiver, or an infrared transceiver.

In various embodiments, a ring unit of an MMRS has one or more of an optical scanner, an RFID tag reader, a magnetic strip (e.g. credit card) reader, and a biometric reader/scanner (e.g. a fingerprint reader or a retina scanner). In some embodiments, an optical scanner is optimized to scan bar codes. In some embodiments, an optical scanner is enabled to scan printed text.

In some embodiments, an MMRS has a computing device enabled to communicate via a network, and adapted to communicate wirelessly with another unit of the MMRS, such as a wrist unit or a ring unit. In various embodiments, the communication in a wireless fashion is via a radio communication protocol, such as 802.11 or Bluetooth. In some embodiments, the communication in a wireless fashion is via infrared signaling. In various embodiments, software running on the computing device is enabled to process input from other units of the MMRS. For example, in some embodiments, the computing device is enabled to process user input applied at a unit of the MMRS, such as manual operation of switches on a ring unit. In another example, in various embodiments, the computing device is enabled to process input gathered by a unit of the MMRS, such as a data stream of an optical scan performed by an optical scanner of a ring unit, or a tag value obtained by an RFID tag reader of a ring unit. In yet another example, in some embodiments, the computing device is enabled to provide information for improved user feedback (e.g. "scan information successfully entered into database") to the MMRS.

In some embodiments, an MMRS has one or more processors. In some embodiments, one of the one or more processors is included in a wrist unit of the MMRS. In some embodiments, one of the one or more processors is included in a ring unit of the MMRS. In various embodiments, a processor in a ring unit of an MMRS enables local control of scanning and/or reading devices, such as an optical scanner or an RFID tag reader. In some embodiments, local control of scanning and/or reading devices includes interpreting results of scanning and/or reading to produce processed results, and communicating the processed results to a computing device, such as a host PC. In various embodiments, a processor in a ring unit of an MMRS enables local processing of user input, such as operation of switches of the ring unit. In some embodiments, local processing of input of switches includes debouncing of the switches. In some embodiments, local processing of user input includes interpreting the user input, and communicating the user input to a computing device, such as a host server or PC.

In some embodiments, an MMRS has a plurality of user-operable switches. In various embodiments, one or more switches are on a wrist unit. In various embodiments, one or more switches are on a ring unit. In some embodiments, a pair of user-operable switches is provided on a ring unit, such as one on each side of the ring unit. In some embodiments, each switch of the pair of switches operates independently. In some embodiments, each switch of the pair of switches is separately enabled to signal an event, such as by closing (or opening) a contact, when pressure is applied to (or removed from) the respective switch.

In some embodiments, a pair of user-operable switches is provided, one on each side of a ring unit, the pair arranged so that each of the user-operable switches is activated by pressure, such as squeezing, from fingers adjacent to a finger the ring unit is worn on. For example, in some usage scenarios where the ring unit is on a right index finger, a left user-operable switch is activated by pressure of an adjacent thumb, and a right user-operable switch is activated by pressure of an adjacent middle finger. In some usage scenarios, providing a pair of user-operable switches enables the ring unit to be used equally by both left-handed and right-handed users, without a need to physically alter, modify, or reconfigure the ring unit.

In some embodiments, a ring unit of an MMRS has a pair of user-operable switches, one on each side of the ring unit, and arranged so that the user-operable switches are activated by pressure, such as squeezing, from fingers adjacent to a finger the ring unit is worn on. In some embodiments, the ring unit is a single piece assembly with no ability for a user to mechanically re-arrange or re-configure a physical form factor of the ring unit. For example, because the switches are arranged symmetrically, one on each side of the ring unit, the ring unit is enabled for left- or right-handed use without mechanical rearrangement, reconfiguration, or alteration.

In some embodiments, a ring unit of an MMRS has a pair of user-operable switches, one on each side of the ring unit, with the switches formed as paddles. Each paddle acts as one side of a respective L-shaped rocker bar mechanism, with the respective paddle having a respective nominal (sans pressure) position, wherein pressure on the respective paddle pivots the respective rocker bar around a central point. The pivoting causes another side of the respective rocker bar to contact and to depress a respective membrane switch mounted on a flexible PCB, and further causes the respective membrane switch to register a respective transition. In some embodiments, releasing pressure on one of the paddles causes the respective membrane switch to return to a non-depressed state. The return of the respective membrane switch exerts a restorative force on the respective L-shaped rocker bar that returns the one of the paddles to the respective nominal position. In some embodiments, the paddle is affixed to the L-shaped rocker bar mechanism. In other embodiments, the paddle forms one side of the L-shaped rocker bar mechanism.

In some embodiments, a ring unit of an MMRS has a pair of user-operable switches, and the switches specify a two-bit, binary code. Each bit of the code is determined from an on-off (active/inactive) state of a respective one of the pair of switches. The code specifies up to four distinct operating modes of the ring unit. For example, if neither switch is depressed, a first mode is indicated; if only a left switch is depressed, a second mode is indicated; if only a right switch is depressed, a third mode is indicated; and if both switches are depressed, a fourth mode is indicated. In some usage scenarios, the modes correspond to operating modes of the ring unit, such as off (no scanning/reading active), optical scan active, RFID tag read active, and both optical scan and RFID tag read active. In some embodiments, information about mode selection is communicated from the MMRS to a computing device via a wireless communications mechanism. For example, in some usage scenarios, the modes correspond to ways of using information obtained via the ring unit, such as off (no scanning active), scan/read to verify inventory, scan/read to add inventory, and scan/read to delete inventory. For another example, in some usage scenarios, the modes correspond to operation in a scanning system with optional improved user feedback (via interaction with a host processor), such as scan with improved user feedback and scan without improved user feedback.

In some embodiments, a ring unit of an MMRS has a pair of user-operable switches, and the switches specify a plurality of codes. In some usage scenarios, depending upon a sequence and a simultaneity of depressing the switches, different codes are signaled. For example: if neither switch is depressed, a first code is indicated; if only a left switch is depressed, a second code is indicated; if only a right switch is depressed, a third code is indicated; if both switches are simultaneously depressed, a fourth code is indicated; if the right switch is depressed followed by the left switch, a fifth code is indicated; and if the left switch is depressed followed by the right switch, a sixth code is indicated. In various embodiments, other ways of using the switches, such as tapping the switches, or holding the switches for long or for short durations, or other combinations and sequences, specify different codes.

In some embodiments, a code specified by the user-operable switches is used, at least in part, to determine an operating mode of the MMRS. In some embodiments, a code specified by the user-operable switches is communicated wirelessly to a computing device, such as a host PC, for further processing and/or interpretation.

In some embodiments, at least some of the codes are directly processed by control circuitry in the ring unit. In some embodiments, at least some of the codes are communicated from the ring unit to a wrist unit and are processed at the wrist unit. In some embodiments, at least some of the codes are communicated from the MMRS to a computing device via a wireless communications mechanism, and are processed at the computing device. In some embodiments, where or how a code is processed is dependent on a value of the code. For example, if the code is a first value, then the code is directly processed by control circuitry in the ring unit. If the code is a second value, then the code is communicated from the ring unit to a wrist unit and processed at the wrist unit. If the code is a third value, then the code is communicated from the MMRS to a computing device via a wireless communications mechanism, and processed at the computing device.

In various embodiments, functions are associated with at least some of the codes, and the associations between the functions and the at least some of the codes are changeable by a computing device coupled to the MMRS via a wireless communications mechanism. For example, initially a first function is performed when a left switch is depressed, and a second function is performed when a right switch is depressed. Upon application of a change by a computing device coupled to the MMRS via a wireless communications mechanism, the second function is performed when the left switch is depressed, and the first function is performed when the right switch is depressed. In some embodiments, the computing device assigns, reassigns, or modifies one or more functions associated with or specified by the switches based on user input at the computing device (e.g. via a keyboard, mouse, or other user interface mechanism). In some embodiments, the computing device changes which of one or more functions are performed when the switches are activated, and the changes are based on the codes communicated by the scanner to the computing device. In some embodiments, the changes are dynamically made during otherwise normal operation. In some embodiments, the changes are restricted to occur only during operation in one or more configuration contexts.

In some embodiments, an MMRS has a user-output mechanism. In various embodiments, all or any portion of the user-output mechanism is on a ring unit, a wrist unit, or both. In various embodiments, the user-output mechanism is a display unit adapted for wearing, such as in the form of a pair of glasses. In various embodiments, the user-output mechanism has any combination of one or more LEDs or lights, a speaker (e.g. for generating audio output), an LCD display, and a projection display. In some usage scenarios, the user-output mechanism signals information to a user of the MMRS in response to operation of the MMRS. For example, in some embodiments, a current operating mode (or change thereof) of the MMRS is signaled via the user-output mechanism. In some embodiments, a successful scan is signaled via the user-output mechanism. In some embodiments, a computing device coupled to the MMRS via a wireless communications mechanism is enabled, at least in part, to signal via the user-output mechanism.

In some embodiments, one or more interactions between the user, the scanner, and a computing device, are managed via a scanning system that includes an MMRS embodied, for example, as a cordless scanner device, according to any of the foregoing embodiments. A first embodiment of a cordless scanner device for use in conjunction with at least one wireless enabled host processor, the first embodiment including: a scan engine, a wireless interface for coupling the scan engine to the wireless enabled host processor; at least one scan status indicator; user feedback logic coupled to the wireless interface and the at least one scan status indicator; a housing at least partially containing the scan engine, the wireless interface, the at least one scan state indicator, and the user feedback logic; and wherein the user feedback logic selectively changes the state of the at least one scan status indicator based upon scan confirmation status sent by the host processor. The preceding embodiment, wherein the scan confirmation status indicates whether or not the host processor successfully received scan data from the scan engine.

A second embodiment, including all of the aspects of the first embodiment, wherein the scan confirmation status is sent embedded in a command stream sent from the host processor to the scan engine. The second embodiment, wherein the scan confirmation status is sent as an extended SSI command. The second embodiment, wherein the user feedback logic captures the embedded scan confirmation status and implements the change in the at least one scan status indicator in accordance with the captured scan confirmation status. The preceding embodiment, wherein the at least one scan status indicator includes a green light. The preceding embodiment, wherein the green light does not illuminate until the host processor indicates that it has successfully received a scan. The preceding embodiment, wherein the green light is implemented using LED technology.

A third embodiment, including all of the aspects of either the first or the second embodiments, wherein the scan engine uses optics based scanning. The third embodiment, wherein the scan engine is for scanning bar codes. The third embodiment, wherein the scan engine includes a laser scanner. The third embodiment, wherein the scan engine includes a 1D CCD array. The third embodiment, wherein the scan engine includes a 2D CCD imager.

A fourth embodiment, including all of the aspects of either the first or the second embodiments, wherein the scan engine uses RF based scanning. The fourth embodiment, wherein the scan engine is for scanning RFID tags. The fourth embodiment, wherein the scan engine uses inductive coupling techniques. The fourth embodiment, wherein the scan engine uses perturbated reflected RF energy techniques. The fourth embodiment, wherein the scan engine uses microwave backscatter techniques. The fourth embodiment, wherein the scan engine is enabled to read a magnetic stripe. The foregoing embodiment, wherein the magnetic stripe is part of a credit card.

A fifth embodiment, including all of the aspects of any of the first through the fourth embodiments, wherein the wireless interface of the wireless scanner is compatible with an industry standard for personal area wireless networking. The forgoing embodiment wherein the industry standard is compatible with the Bluetooth standard. A sixth embodiment, including all of the aspects of any of the first through the fourth embodiments, wherein the wireless interface of the wireless scanner is compatible with an industry standard for local area wireless networking. The forgoing embodiment wherein the industry standard is compatible with the WiFi standard. A seventh embodiment, including all of the aspects of any of the first through the fourth embodiments, wherein the wireless interface of the wireless scanner is infrared.

An eighth embodiment, including all of the aspects of the first embodiment, wherein the scan status indicators transition between states that include: standby for host confirmation and good scan at host. The preceding embodiment, wherein the states further include: waiting on user, and bad scan at host.

A ninth embodiment, including all of the aspects of the first embodiment, wherein the scan engine performs a scan only when the wireless link between the scan engine and the host processor is working.

Multi-Mode Ring Scanner

Figure 10:
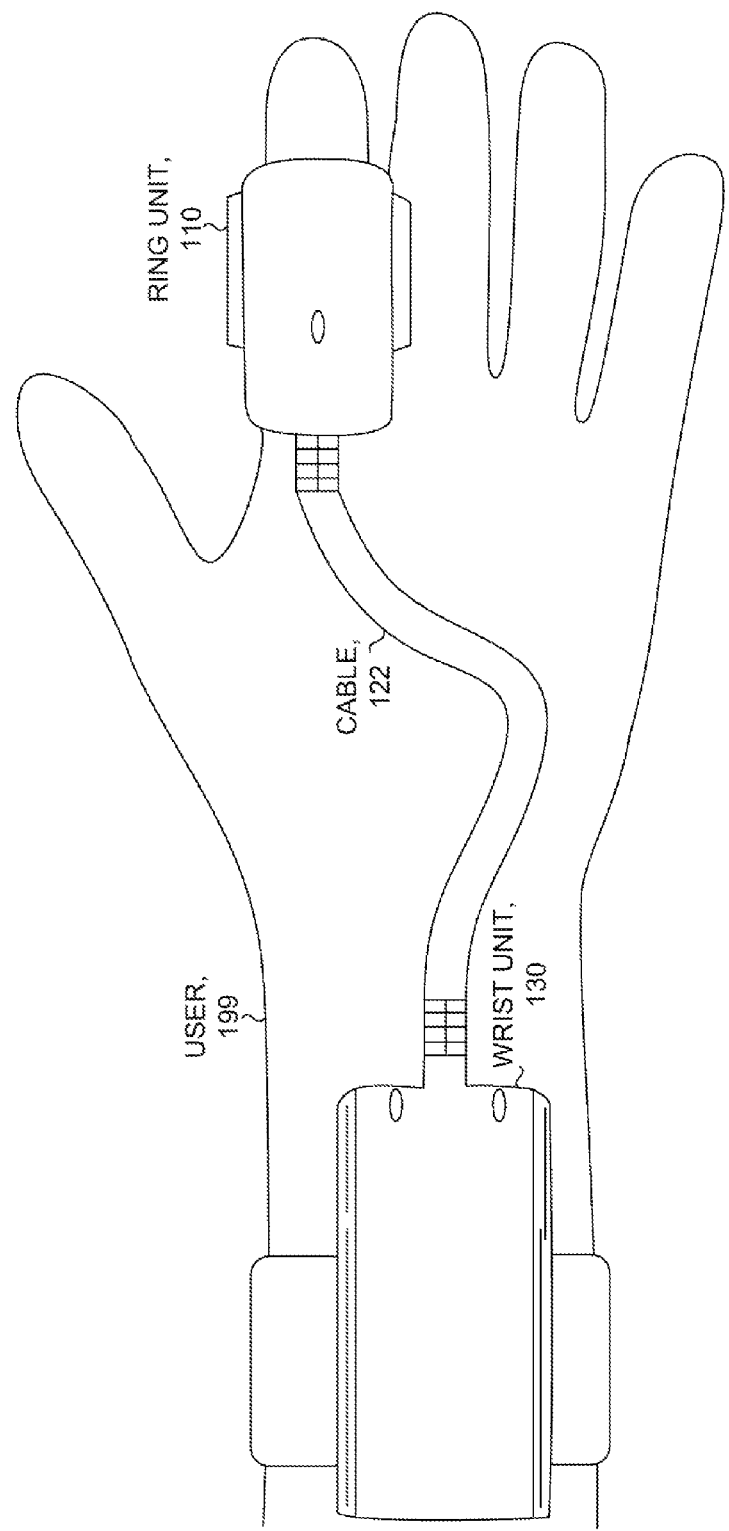
FIG. 10 illustrates selected details of an example of deployment of a multi-mode ring scanner, showing the multi-mode ring scanner worn by a user.

FIG. 1 illustrates selected details of an embodiment of a ring unit of an MMRS, showing a three-dimensional view of the top, the front, and the left side. FIG. 1 illustrates ring unit 110. In some embodiments, ring unit 110 includes a coupling for cable 122, enabling ring unit 110 to couple with a wrist unit, such as wrist unit 130, as shown in FIG. 10. In other embodiments, ring unit 110 operates without cable 122 and connects wirelessly to a wrist unit, or connects wirelessly directly to a network and/or to a computing device. The wireless connectivity is provided, for example, via inclusion of one or more of a Bluetooth transceiver, an 802.11 wireless transceiver, a ZigBee transceiver, a UWB transceiver, a WLAN or WPAN transceiver, or an infrared transceiver.

FIGS. 2 to 7 illustrate selected details of an embodiment of a ring unit of an MMRS, showing differing views. FIGS. 2 and 6 are side views. FIG. 3 is a back view. FIG. 4 is a top view. FIG. 5 is a front view. FIG. 7 is a bottom view.

FIGS. 3 and 5 also illustrate strap 190. Strap 190 provides a way to secure ring unit 110 to a finger of a user, such as user 199, as shown in FIG. 10. In some embodiments, strap 190 is an adjustable strap. In some embodiments, strap 190 is fabric hook-and-loop fastener (such as a Velcro strap).

Example of Deployments

FIG. 10 illustrates selected details of an example of deployment of an MMRS, showing the MMRS worn by a user. In some embodiments, ring unit 110 and wrist unit 130 are coupled via cable 122. As shown in the example of FIG. 10, both ring unit 110 and wrist unit 130 are deployed on a finger and on a wrist, respectively, of user 199. In some embodiments, not shown in FIG. 10, functionality of the wrist unit is subsumed into the ring unit, and the wrist unit and the cable are not present.

In some embodiments, cable 122 is a stretchable cable. The stretchable cable is adapted to permit a full range of movement of the hand and wrist. At the same time, the stretchable cable is adapted to minimize or eliminate the "loop" (the gap between the hand and the cable) that would otherwise be formed with a non-stretchable cable, by reducing excess cable length when the hand and wrist are in some configurations. In various usage scenarios, minimizing or eliminating the loop (or reducing the slack in the cable) improves visual appeal, reduces chances of catching the loop on (or by) adjacent objects, or both. In various embodiments, the stretch cable is a flat, a ribbon cable, or a coiled cable. The stretch cable length is such that a slight tension is maintained between the wrist unit and the ring unit when the wrist unit and the ring unit are in closest proximity to each other during use.

Figure 11A:
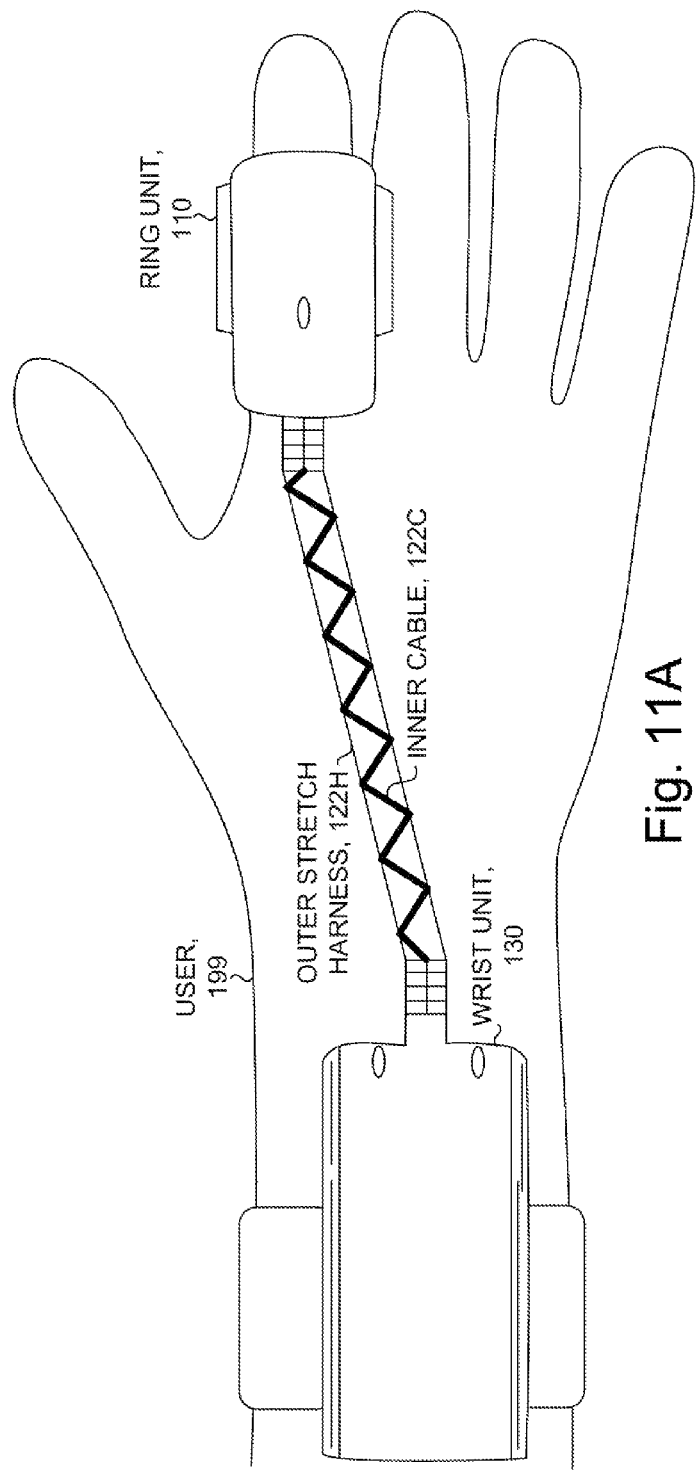
Figure 11B:
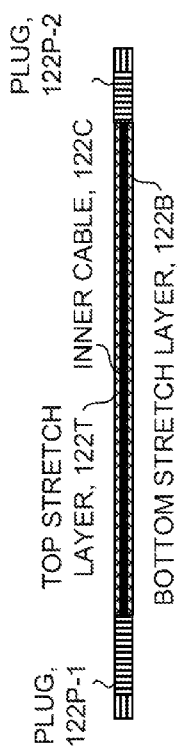

FIG. 11A illustrates selected details of another example of deployment of an MMRS, showing from a top view the use of a stretch ribbon cable to couple ring unit 110 and wrist unit 130. As shown, the stretch cable has an outer stretch harness 122H holding an inner cable 122C. In various embodiments, the inner cable 122C is arranged in a serpentine, z-fold (illustrated), or other configuration. In some embodiments, the inner cable is captured between two layers of stretch material (such as elastic fabric). In various embodiments, the layers are held together by glue, epoxy, stitching, or other fastening. FIG. 11B illustrates selected details of stretch ribbon cable 122C of FIG. 11A from a side view. The stretch ribbon cable includes plug 122P-1 for mating with wrist unit 130 and plug 122P-2 for mating with ring unit 110. The inner cable 122C is held between a top stretch layer 122T and a bottom stretch layer 122B. FIG. 11C illustrates selected details of another example of deployment of an MMRS, showing from a top view the use of a stretch coiled cable 122D coupling ring unit 110 and wrist unit 130. FIG. 11D illustrates selected details of stretch coiled cable 122D of FIG. 11C from a side view. The stretch coiled cable includes plug 122P-3 for mating with wrist unit 130 and plug 122P-4 for mating with ring unit 110.

Multiple Input Devices

FIG. 8A illustrates selected details of an embodiment of a ring unit of an MMRS, showing a cross-sectional view of a vertical slice as seen from the front. Ring unit 110, as shown in FIG. 8A, has circuitry 850 and flexible PCB 840 enclosed by outer casing 833. In some embodiments, flexible PCB 840 is wrapped around shelf 842, providing mechanical support for both a top portion and a bottom portion of the flexible PCB. Circuitry 850 includes, in various embodiments, scanning and/or reading devices (such as optical scanners, RFID tag readers, magnetic strip readers, and biometric readers/scanners). In some embodiments, circuitry 850 has one or more communications mechanisms, such as an interface to cable 122 or a Bluetooth transceiver. In some embodiments, circuitry 850 further has control circuitry, such as a local processor. In some embodiments, the local processor has associated memories, such as flash memory and/or static random access memory. In some embodiments, a portion of circuitry 850 is mounted on flexible PCB 840. In some embodiments, a portion of circuitry 850 is mounted on shelf 842.

Ring unit 110 further has rocker arms 810 and 811. The rocker arms are designed so that inward pressure (towards a central axis of the ring unit), applied by a wearer of the ring unit, causes the rocker arms to pivot and an end of the rocker arms to contact a switch on flexible PCB 840. This is shown in more detail in FIG. 8B.

Figure 8B:
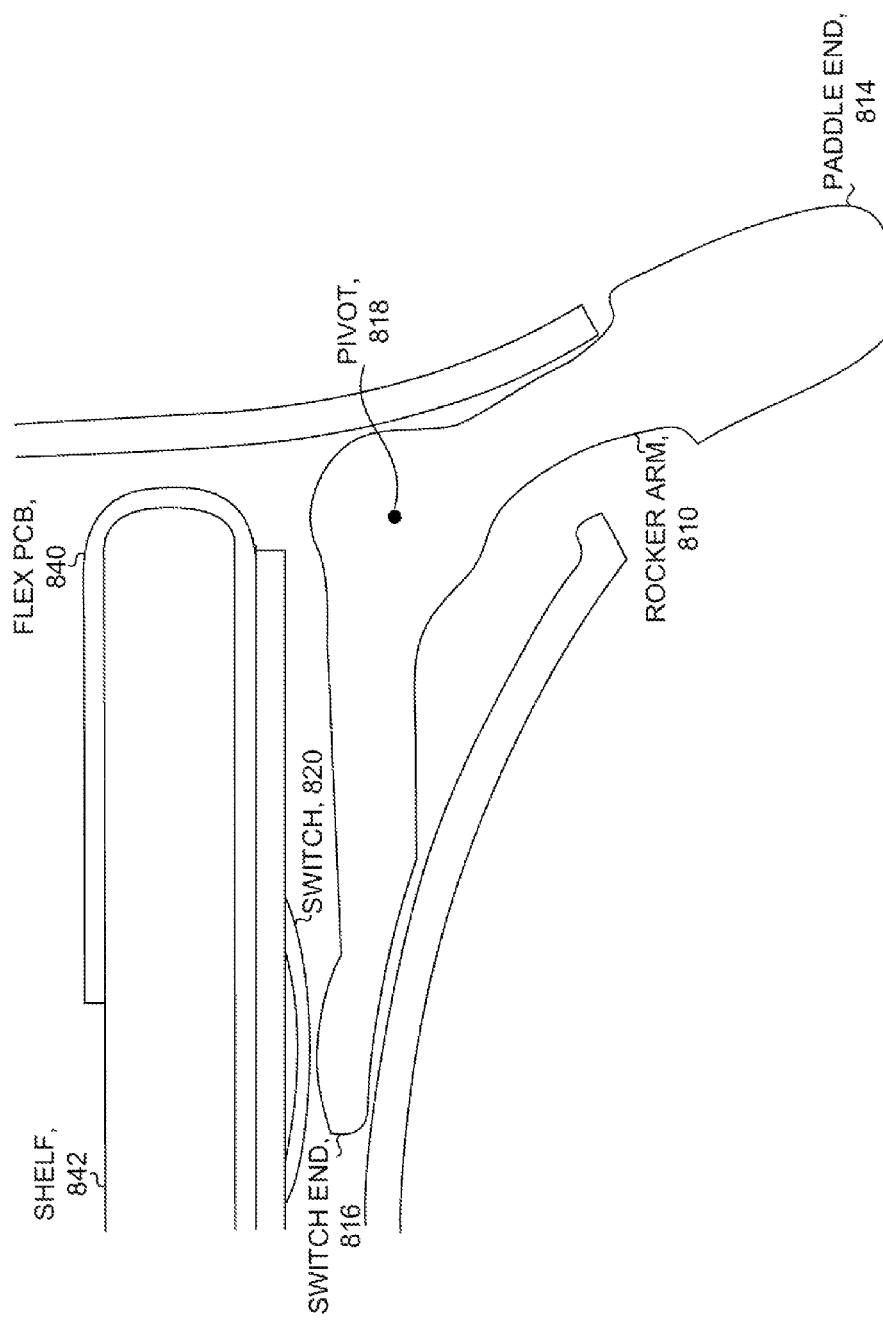
FIG. 8B illustrates selected details of an embodiment of a ring unit of a multi-mode ring scanner, showing an enlargement of a portion of FIG. 8A.

FIG. 8B illustrates selected details of an embodiment of a ring unit of an MMRS, showing an enlargement of a portion of FIG. 8A. FIG. 8B illustrates rocker arm 810, showing how the rocker arm is enabled to activate a switch. Rocker arm 810 has a nominal position (when no inward pressure is applied to the rocker arm). Inward pressure on paddle end 814 pivots the rocker arm around pivot point 818, causing switch end 816 to elevate and to depress switch 820 mounted on flexible PCB 840. In some embodiments, switch 820 is a membrane switch. In some embodiments, removal of pressure on paddle end 814 causes membrane switch 820 to exert pressure on switch end 816, returning rocker arm 810 to the nominal (no inward pressure) position. In some embodiments, flexible PCB 840 is wrapped around shelf 842, providing mechanical support for both a top portion and a bottom portion of the flexible PCB, the bottom portion having switch 820.

Attachment of Input Devices

Figure 9B:
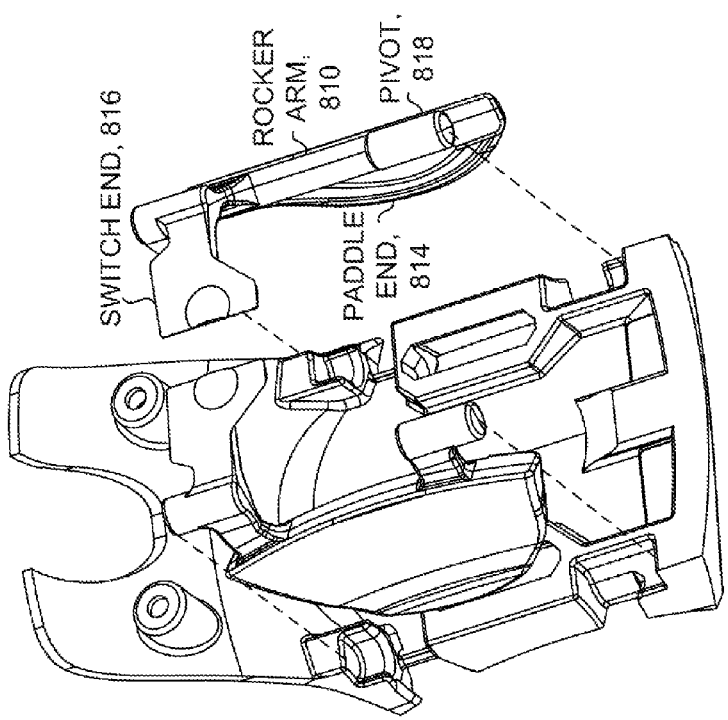
FIGS. 9A and 9B illustrate selected details of an embodiment of a ring unit of a multi-mode ring scanner, showing a cut-away view from the top.
Figure 9A:
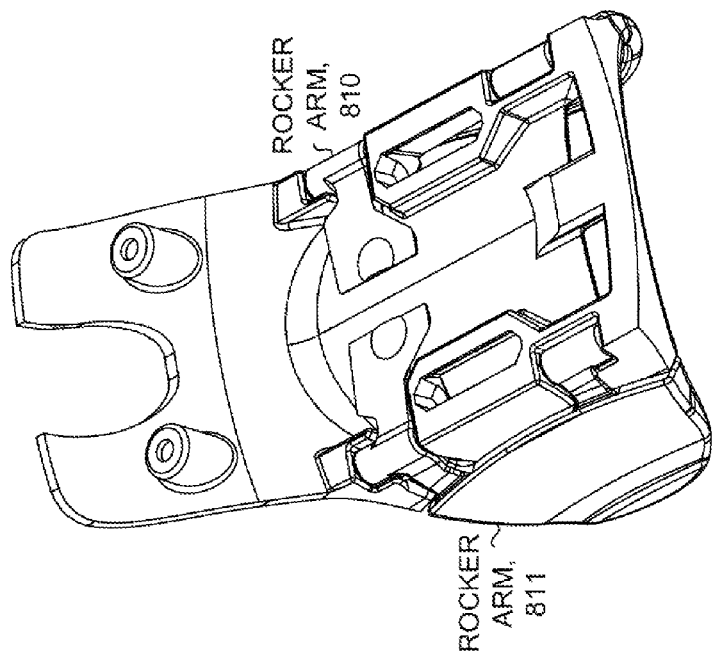

FIGS. 9A and 9B illustrate selected details of an embodiment of a ring unit of an MMRS, showing a cut-away view from the top. In FIGS. 9A and 9B, the upper portion of the ring unit (circuitry 850, flexible PCB 840, shelf 842, and outer casing 833 as shown in FIG. 8A) are not illustrated to show a view of rocker arms 810 and 811, and a manner of attachment and operation.

As illustrated by FIGS. 9A and 9B, rocker arms 810 and 811 have a paddle end, such as paddle end 814 of rocker arm 810, and a switch end, such as switch end 816 of rocker arm 810. The rocker arms have one or more pivot points, such as pivot point 818 of rocker arm 810, enabling the rocker arm to rotate so that in response to inward pressure on the paddle end, the switch end elevates, causing the switch end to contact a switch, such as a membrane switch, on a flexible PCB (not shown in FIGS. 9A and 9B).

As shown in FIGS. 9A and 9B, rocker arms 810 and 811 are independent, and operate freely and without interfering with each other. This permits user operation of the paddles, and thereby the switches they depress, to occur in a wide range of combinations and sequences.

Multi-Mode Operation

One or more processors included in a wrist unit, a ring unit, or both of an MMRS, enable local processing functions, such as local control of scanning and/or reading devices, interpretation and implementation of actions relating to switches of the ring unit, and communication of information between the units of the MMRS or between a host server or PC. Activations (and deactivations) of the switches are optionally processed to change an operating mode (from among a plurality of operating modes) of the MMRS, to signal an event, or to specify a code to communicate to the host.

For example, an embodiment of an MMRS includes a pair of switches, and a first mode is entered when a first one of the two switches is activated, a second mode is entered when a second one of the two switches is activated, a third mode is entered when both of the two switches are activated, and a fourth mode is entered when neither of the two switches are activated. Exemplary modes include no scanning/reading active, optical scan active, RFID tag read active, and both optical scan and RFID tag read active. Further exemplary modes relate to ways of using information from the MMRS, such as off (no scanning active), scan/read to verify inventory, scan/read to add inventory, and scan/read to delete inventory. The modes relating to ways of using the information are optionally communicated to the host. Further exemplary modes correspond to operation with and without improved user feedback (such as from the host). For another example, any of four distinct events or codes is signaled by activation/deactivation of the pair of switches (first on and second off, first off and second on, first and second on, and both off).

The processing of the activations (and the deactivations) is, in various embodiments, performed on any combination of the processors included in the MMRS and the processing resources of the host. In some embodiments, processing relating to various activations/deactivations is performed selectively dependent on the particular activation/deactivation. As an example, activation of a first switch specifies turning on a scanner of the ring unit, and activation of a second switch specifies toggling between inventory add and inventory deletion operation. Activation of the first switch is processed by the processors included in the MMRS and activation of the second switch is processed by the processing resources of the host.

Operation of the MMRS is alterable, in some embodiments, by the host. For example, initially, first and second modes are entered, respectively, when respective ones of the switches are pressed. Subsequently, the host directs the MMRS to operate such that third and fourth modes are entered, respectively, when respective ones of the switches are pressed.

Modes, events, and/or codes are specified, in various embodiments, according to "static" and "dynamic" activation/deactivation of the switches of the MMRS. An example of static activation (deactivation) is turning a switch on (or leaving a switch off) for a relatively long period of time. Examples of dynamic activation (deactivation) are tapping a single switch, or tapping different switches in sequence.

Wireless Scanner System

Figure 12:
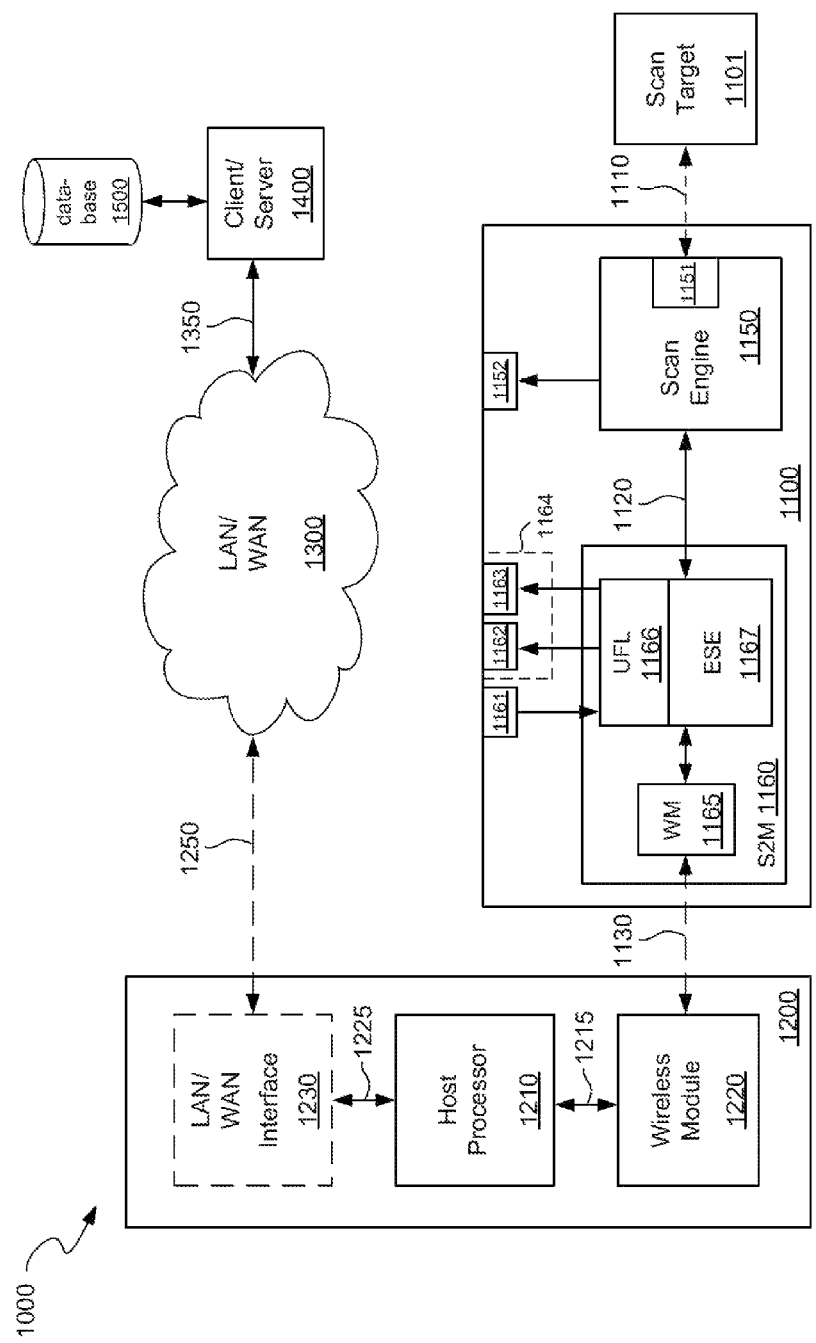
FIG. 12 illustrates a system context of an illustrative embodiment of a wireless scanner with improved user feedback.

FIG. 12 shows an illustrative embodiment of a wireless scanner 1100 with improved user feedback in the context of system 1000. In system 1000, scan target 1101 is scanned by scanner 1100 via scan process 1110. Scan process 1110 may take a variety of forms, such as passive and active optical and RF techniques for scanning printed codes and RFID tags.

Scanner 1100 includes scan engine 1150 (including scan transducer 1151 and audible indicator 1152) coupled via 1120 to Scanner-to-Host (S2H) interface module 1160, control 1161, visual indicator group 1164 (including amber light 1162 and green light 1163). According to various embodiments, visual scan indicator group 1164 includes one or more lights (such as a green LED of an MMRS). Scanner-to-Host (S2H) interface module 1160 includes wireless module (WM) 1165, User Feedback Logic (UFL) 1166 and Extended SSI Engine (ESE) 1167. In an illustrative embodiment, coupling 1120 is logically compatible with an RS-232 link. According to various embodiments, all or any portions of scanner 1100 are included in any combination of a wrist unit, a cable, and a ring unit (such as wrist unit 130, cable 122, and ring unit 110 of FIG. 10).

Scanner 1100 communicates scan data to host 1200 via wireless connection 1130. Wireless connection 1130 may take a variety of forms, such as PAN technology (e.g., Bluetooth or ZigBee), LAN technology (e.g., WiFi), or optical technology (e.g., infrared). In illustrative embodiments, for some applications where host 1200 is a PDA, tablet PC, or phone (e.g. mobile or cell), Bluetooth class 2 is used, having a range of roughly 10 meters. For some applications where host 1200 is a desktop, Bluetooth class 1 is used, having a range of roughly 100 meters.

Host 1200 may take a variety of forms, such as point-of-sale terminals; desktop, laptop, and tablet PCs; PDAs; and mobile/cell phones. Host 1200 includes host processor 1210 coupled via link 1215 to wireless module 1220 and optionally via interconnect 1225 to optional LAN/WAN interface 1230. In an illustrative embodiment, link 1215 is connected to a standard com (serial communications) port of the host processor. Host 1200 includes an operating system (such as Symbian, Palm, Microsoft, Linux, or embedded variations of the foregoing, depending on the platform) and device drivers for scanner 1100.

Link 1215 is, in various embodiments, compatible with USB, PCI, SD, and ExpressCard bus signaling and/or protocols. Link 1215 uses, in various embodiments, a protocol that is compatible with transport provided by link 1130. For example, in some embodiments where the host is a PDA or phone, link 1215 uses a protocol compatible with the industry standard H4 serial protocol to communicate the SSI data between the host processor and the scanner. For another example, in some embodiments where the host is a desktop, laptop, or tablet PC, a protocol compatible with the industry standard USB protocol is used.

Host 1200 optionally communicates over network LAN/WAN 1300 to client/server 1400 (via host-to-network link 1250 and client/server-to-network link 1350). LAN/WAN 1300 may take a variety of forms such as a LAN, a larger departmental network, an intranet, and the Internet. Links 1250 and 1350 may take a variety of forms such as Ethernet, WiFi, RS-232, dial-up modem, and mobile/cell phone technologies. Wireless links employ antennas, perhaps embedded within their associated devices, perhaps at least partially external, none of which are explicitly shown, but are understood to be present to those of ordinary skill in the art.

Client/server 1400 generally has an associated database 1500 that may be queried or updated in response to the scan of scan target 1101. Alternatively, such a database may in whole or in part reside on host 1200 and be queried or updated locally, and the LAN/WAN connection may be established periodically to synchronize the local and remote copies of the database.

The scan data is transferred over the links using various degrees of encoding and encapsulation. Scan engine 1150 communicates using the industry SSI protocol, that encapsulates ASCII data corresponding to scanned code. Example off-the-shelf SSI modules suitable for use as scan engine 1150 are the SE4400, 923, 824, and Positron modules, all by Symbol Technologies. Other modules are suitable for use as the scan engine, such as the Intermec EA15. In some embodiments, ESE 1167 and host processor 1210 communicate using an extension of the SSI protocol, described below. The extended SSI protocol is bridged onto wireless link 1130. The device drivers within host 1200 (for use with scanner 1100), and the firmware within ESE 1167, are enabled to use the extended SSI protocol.

In an illustrative embodiment, data received by ESE 1167 from host processor 1210 over wireless link 1130 is generally resent over RS-232 link 1120 as a command to scan engine 1150 using an RTS/CTS control handshake. Data received by ESE 1167 from scan engine 1150 over RS-232 link 1120 is generally resent to host processor 1210 using the flow control protocol of wireless link 1130.

To enable host processor 1210 to send messages to scanner 1100 over wireless link 1130, a current SSI command from the "HOST" to the scan engine has been lengthened. In an illustrative embodiment, the command selected is the SSI command CMD_NAK, which has the Opcode 0xD1 and a minimum length of 6 bytes.

As illustrated in the following table, an SSI Sub Command of CMD_NAK is defined with a payload that includes an indication that the host processor did (ACK), or did not (FAIL), receive a good scan. How these indications are used is detailed in conjunction with examination of FIG. 13, discussed next. Other embodiments use other techniques for extending the SSI command set, or use a custom command set, to equivalently provide the scanner with the host scan confirmation.

TABLE 1

Host Scan Confirmation Status (Extended SSI Command)

| Field Name | Format | Size | Description |
|---|---|---|---|
| Length | 0x07 | 1 Byte | Length of packet (excludes CS) |
| Opcode | 0xD1 | 1 Byte | SSI Opcode (always 0xD1) |
| Message Source | 0x04 (Host) | 1 Byte | Identifies where the message is coming from. |
| Status | Bit 0: Retransmit Bit 1-7: unused | 1 Byte | Identifies the transmission status. Unused bits must be set to 0. |
| Sub Command | 0x0008 | 2 Bytes | Host Scan Confirmation Status |
| Payload | | 1 Byte | Scan Confirmation Status: 0x00 = bad scan (FAIL) 0x01 = scan received OK (ACK) |
| Checksum | | 2 Bytes | Checksum of message. |

Wireless Scanner User Feedback

Figure 13:
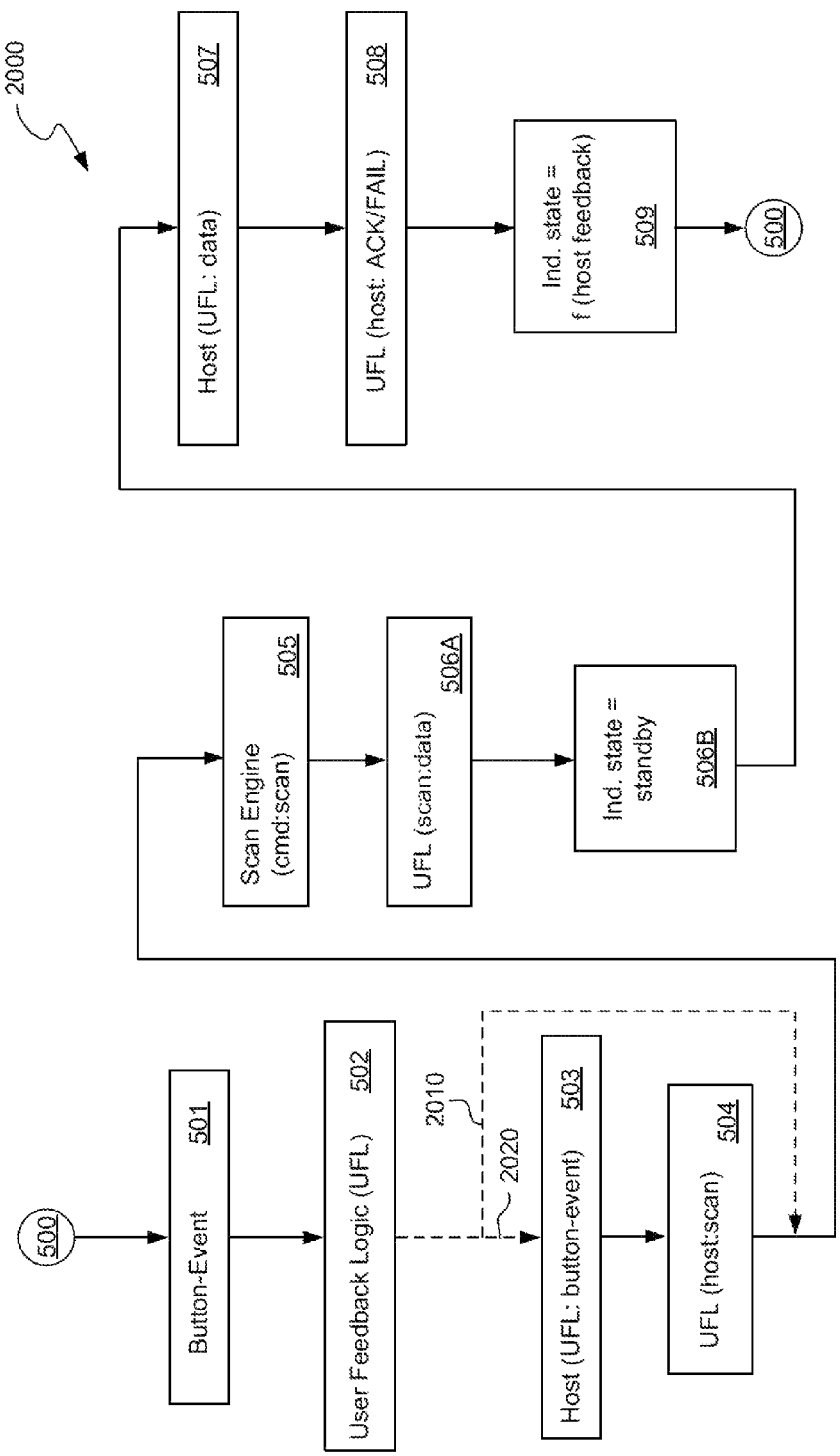
FIG. 13 is a flow diagram illustrating an embodiment of improved user feedback in a wireless scanner.

FIG. 13 is a flow diagram conceptually illustrating improved user feedback in a wireless scanner. Multiple embodiments are illustrated by the figure, corresponding to dashed paths 2010 and 2020.

Flow begins conceptually at operation 500, corresponding to waiting for a new scan to be user initiated. Button-event, operation 501, corresponds to the user initiating a scan by pressing scan button 1161. The button-event is then noted by User-Feedback Logic (UFL) 1166 in operation 502. According to various embodiments, scan button 1161 corresponds to either of two switches, such as activated by rocker arms 810 or 811 of FIG. 8A, e.g. by squeezing or pressing respective paddles. In various embodiments, an activation of scan button 1161 corresponds to specification of one or more of a plurality of codes via operation of the paddles or a sequence of operations of the paddles. In one example, activation of the scan button corresponds to squeezing a left (or right) paddle that depresses a left (or right) switch. In another example, activation of the scan button corresponds to squeezing the left paddle followed by squeezing the right paddle, thus depressing the left switch followed by depressing the right switch.

From operation 502, flow continues down one of path 2010 or 2020. In a first embodiment, corresponding to path 2020, host processor 1210 receives notice of the button-event from UFL 1166 in operation 503. UFL 1166 subsequently receives a scan initiation command from host processor 1210 in operation 504. In a second embodiment, flow follows path 2010, bypassing operations 503 and 504 (these operations are not implemented if path 2010 is followed). In both embodiments, flow continues to operation 505.

Scan engine 1150 receives the scan initiation command from UFL 1166 in operation 505, and initiates a scan. The scan engine returns scan data and status to UFL 1166 in operation 506A.

Whether to use path 2010 or 2020 is an implementation dependent choice. In some usage scenarios, path 2020 is preferable if the additional operations do not introduce a significant delay in initiating the scan. When flow includes path 2020, UFL 1166 will not proceed to operation 505 until it receives a scan command from host processor 1210. If the scan command is not received within a timeout interval, the flow returns to operation 500, without the scan engine being activated. This abnormal timeout path is not explicitly illustrated in FIG. 13. In some usage scenarios, not activating the scan engine when the wireless link is down is a benefit of using the embodiment of path 2020. Activating the scan engine (which generates scanning behavior that the user generally perceives) when the wireless link is down may confuse the user.

Reduced path delay frequently is in tension with reduced power consumption. E.g., if a Bluetooth wireless link is used for link 1130, the sleep configuration of the Bluetooth radios adjusts how often the radios are enabled within their allocated time slots, which directly impacts both battery life and latency. If the overall path latency prior to initiating the scan is too much, and reducing the latency by increasing power consumption is not an option, then in some usage scenarios, path 2010 is used.

The state of visual indicators 1164 is changed to "standby" (amber light 1162 is lit) in operation 506B, corresponding to the first opportunity that UFL 1166 has to receive scan data from the scanner. The standby indication gives visual feedback that the scan action has been completed locally and that the scanner is waiting for host confirmation (i.e. host confirmation is pending). The location of the operation setting the pending indication is not critical, although the exact definition of the standby indication necessarily may change as a result of its placement in the control flow.

In operation 507, UFL 1166 forwards the scan data and status to host processor 1210. Once host processor 1210 has determined that the scan was successful, the host processor communicates success state back to UFL 1166 (via the ACK), in operation 508. If host processor 1210 determines that the scan was not successful (based on the scan status, invalid data, or an elapsed time-out interval), then host processor 1210 optionally communicates failure state back to UFL 1166 (via the FAIL).

In operation 509, the state of visual indicators 1164 is updated as function of the host feedback. In the event of success, UFL 1166 changes the pending indication to a successful completion indication (amber light 1162 is extinguished and green light 1163 is lit). In the event of failure (either due to an explicit FAIL from the host, or due to a timeout without ACK), UFL 1166 changes the pending indication to a failure indication (e.g., by extinguishing amber light 1162 and keeping green light 1163 dark, flashing amber light 1162, or by an additional red light indicator, not explicitly shown). Optionally in operation 509, UFL 1166 also sends a command to scan engine 1150 to sound audible indicator 1152 to provide positive or negative audible feedback (e.g., a short pleasant tone for a successful scan, a long discordant buzz for a failed scan). After operation 509, the process conceptually returns to operation 500, corresponding to waiting for a new scan to be user initiated.

Thus UFL 1166 indicates transitions among four states via corresponding transitions of the lights and tones. The states (and associated example visual and audible indications) are Waiting on User (no lights), Standby for Host Confirmation (amber light), Good Scan at Host (green light, positive tone), and Bad Scan at Host (red light, negative tone).

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims of the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as a type, a size, a configuration, or a pinout of a connector; a type or a size of a cable; a form factor or physical dimensions of a card; types of radio circuitry or frequencies of radio transmission or reception; a type of processor or a nature of control circuitry; a manner of wearing or attaching a ring unit to a finger; a manner of wearing or attaching a wrist unit; and the number of entries or stages in registers and buffers), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims of the issued patent.

What is claimed is:

1. A system for scanning an object comprising:
   means for receiving commands from a host via a wireless link;
   means for scanning;
   means for controlling the means for scanning responsive to a control command of the commands;
   means for indicating scan status;
   means for setting the means for indicating scan status to a particular state responsive to a status command of the commands;
   means for at least partially housing the means for scanning and the means for indicating scan status; and
   wherein the means for at least partially housing is compatible with handheld operation.

2. The system for scanning of claim 1, wherein the status command comprises an embedded scan success indicator and the particular state indicates scan success.

3. The system for scanning of claim 1, wherein the means for at least partially housing at least partially houses a means for wireless interfacing that provides the system for scanning with access to the wireless link.

4. The system for scanning of claim 1, further comprising:
   means for processing;
   one or more means for specifying state, each independently specifying one of a plurality of states; and
   wherein the system for scanning is operable in a selected one of a plurality of modes and the means for processing determines the selected mode responsive to current and previous values of the states.

5. The system for scanning of claim 4, wherein the means for at least partially housing comprises a ring unit, the handheld operation comprises wearing the ring unit on a digit of a hand, and the one or more means for specifying state comprise respective switches operable by other digits of the hand.

6. The system for scanning of claim 5, wherein the ring unit at least partially houses a means for wireless interfacing that provides the system for scanning with access to the wireless link.

7. The system for scanning of claim 1, wherein the object is at least one of a printed code and an RFID tag.

8. The system for scanning of claim 1, wherein the host is at least one of a mobile phone, a PDA, a laptop PC, a tablet PC, a desktop PC, and a Point-Of-Sale terminal.

9. A system for scanning an object comprising:
   means for recognizing a scan initiation event;
   means for sending notice of the scan initiation event to a host via a wireless link;
   means for scanning;
   means for receiving scan results from the means for scanning;
   means for indicating status;
   means for controlling the means for indicating status to a standby indication responsive to the means for receiving scan results receiving scan results;
   means for forwarding the scan results to the host via the wireless link;
   means for controlling the means for indicating status to a success indication responsive to the host communicating scan success via the wireless link;
   means for at least partially housing the means for recognizing, the means for scanning, the means for receiving scan results, and the means for indicating status; and
   wherein the means for at least partially housing is compatible with handheld operation.

10. The system for scanning of claim 9, further comprising:
    means for processing;
    one or more means for specifying state, each independently specifying one of a plurality of states; and
    wherein the system for scanning is operable in a selected one of a plurality of modes and the means for processing determines the selected mode responsive to current and previous values of the states.

11. The system for scanning of claim 10, wherein the means for at least partially housing comprises a ring unit, the handheld operation comprises wearing the ring unit on a digit of a hand, and the one or more means for specifying state comprise respective switches operable by other digits of the hand.

12. The system for scanning of claim 11, wherein the ring unit at least partially houses a means for wireless interfacing that provides the system for scanning with access to the wireless link.

13. The system for scanning of claim 9, wherein the object is at least one of a printed code and an RFID tag.

14. The system for scanning of claim 9, wherein the host is at least one of a mobile phone, a PDA, a laptop PC, a tablet PC, a desktop PC, and a Point-Of-Sale terminal.

15. A system for scanning an object comprising:
    means for recognizing a scan initiation event;
    means for sending notice of the scan initiation event to a host via a wireless link;
    means for receiving a scan initiation command sent from the host via the wireless link;
    means for scanning;
    means for communicating scan results from the means for scanning to the host via the wireless link, the scan results being obtained in response to the scan initiation command;
    means for receiving scan status from the host via the wireless link, the scan status being determined by the host in response to the scan results;
    means for indicating status that is altered responsive to the scan status;
    means for at least partially housing the means for scanning and the means for indicating status; and
    wherein the means for at least partially housing is compatible with handheld operation.

16. The system for scanning of claim 15, further comprising:
    means for processing;
    one or more means for specifying state, each independently specifying one of a plurality of states; and
    wherein the system for scanning is operable in a selected one of a plurality of modes and the means for processing determines the selected mode responsive to current and previous values of the states.

17. The system for scanning of claim 16, wherein the means for at least partially housing comprises a ring unit, the handheld operation comprises wearing the ring unit on a digit of a hand, and the one or more means for specifying state comprise respective switches operable by other digits of the hand.

18. The system for scanning of claim 17, wherein the ring unit at least partially houses a means for wireless interfacing that provides the system for scanning with access to the wireless link.

19. The system for scanning of claim 15, wherein the object is at least one of a printed code and an RFID tag.

20. The system for scanning of claim 15, wherein the host is at least one of a mobile phone, a PDA, a laptop PC, a tablet PC, a desktop PC, and a Point-Of-Sale terminal.

* * * * *